United States Patent
Beall et al.

(10) Patent No.: US 8,512,433 B2
(45) Date of Patent: Aug. 20, 2013

(54) LOW BACK PRESSURE POROUS HONEYCOMB AND METHOD

(75) Inventors: Douglas Munroe Beall, Painted Post, NY (US); Achim Karl-Erich Heibel, Corning, NY (US); Pushkar Tandon, Painted Post, NY (US); David John Thompson, Savona, NY (US)

(73) Assignee: Corning Incorporated, Corning, NY (US)

( * ) Notice: Subject to any disclaimer, the term of this patent is extended or adjusted under 35 U.S.C. 154(b) by 272 days.

(21) Appl. No.: 12/990,065

(22) PCT Filed: May 29, 2009

(86) PCT No.: PCT/US2009/003299
§ 371 (c)(1),
(2), (4) Date: Oct. 28, 2010

(87) PCT Pub. No.: WO2009/145910
PCT Pub. Date: Dec. 3, 2009

(65) Prior Publication Data
US 2011/0036080 A1    Feb. 17, 2011

Related U.S. Application Data

(60) Provisional application No. 61/057,295, filed on May 30, 2008.

(51) Int. Cl.
*B01D 39/06* (2006.01)
*B01D 39/14* (2006.01)
*B01D 24/00* (2006.01)
*B01D 50/00* (2006.01)

(52) U.S. Cl.
USPC .......... 55/523; 55/522; 55/524; 422/169; 422/170; 422/17; 422/172; 422/177; 422/178; 422/179; 422/180; 422/181; 422/182

(58) Field of Classification Search
USPC .......... 55/522–524; 422/169–172, 177–182
See application file for complete search history.

(56) References Cited

U.S. PATENT DOCUMENTS

| | | | |
|---|---|---|---|
| 5,753,014 A * | 5/1998 | Van Rijn | 96/12 |
| 7,090,714 B2 * | 8/2006 | Otsubo et al. | 55/523 |
| 7,338,642 B2 * | 3/2008 | Nakatani et al. | 422/180 |
| 8,011,519 B2 * | 9/2011 | Brundage | 210/510.1 |
| 8,071,505 B2 * | 12/2011 | Ebener et al. | 502/439 |
| 8,158,195 B2 * | 4/2012 | Morisaka et al. | 427/243 |
| 2003/0007905 A1 * | 1/2003 | Tanaka et al. | 422/180 |
| 2004/0065068 A1 * | 4/2004 | Otsubo et al. | 55/523 |
| 2004/0219084 A1 | 11/2004 | Hall et al. | |
| 2005/0181939 A1 * | 8/2005 | Xu et al. | 502/325 |
| 2006/0188416 A1 * | 8/2006 | Alward et al. | 422/180 |

(Continued)

Primary Examiner — Amber Orlando
(74) Attorney, Agent, or Firm — Timothy M Schaeberle

(57) ABSTRACT

Disclosed are ceramic honeycomb articles which possess a unique microstructure characterized by porosity between 40% and 70%, and the presence of coarse pores exhibiting a depth equivalent to the thickness of the cell wall and a dimensional width, in the plane of the cell wall, exhibiting a diameter that is at least as large as the thickness of the cell wall. The articles exhibits reduced filtration efficiency coupled with low pressure drop across the filter, and a reduced regeneration need. Such ceramic articles are particularly well suited for filtration applications, such as off-road and retro-fit diesel exhaust filters or DPFs. Also disclosed is a method for manufacturing the ceramic article wherein the pore former is capable of forming coarse pores.

20 Claims, 7 Drawing Sheets

(56) References Cited

U.S. PATENT DOCUMENTS

| | | |
|---|---|---|
| 2007/0039297 A1* | 2/2007 | Kawata et al. ............ 55/523 |
| 2007/0041881 A1* | 2/2007 | Voss et al. .............. 422/177 |
| 2007/0105707 A1 | 5/2007 | Ichikawa |
| 2007/0119134 A1* | 5/2007 | Beall et al. ............ 55/523 |
| 2007/0261378 A1* | 11/2007 | Miao et al. ............ 55/523 |
| 2008/0034739 A1* | 2/2008 | Ranalli .............. 60/295 |
| 2008/0072551 A1* | 3/2008 | Zuberi .............. 55/385.1 |
| 2008/0110143 A1* | 5/2008 | Chen et al. .......... 55/385.1 |
| 2008/0120968 A1 | 5/2008 | Beall |
| 2008/0276586 A1* | 11/2008 | Oya et al. ............ 55/523 |

* cited by examiner

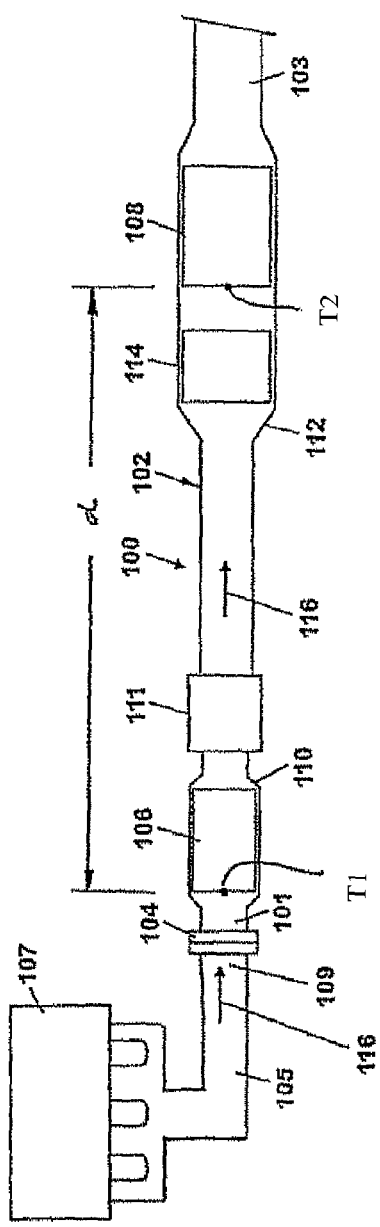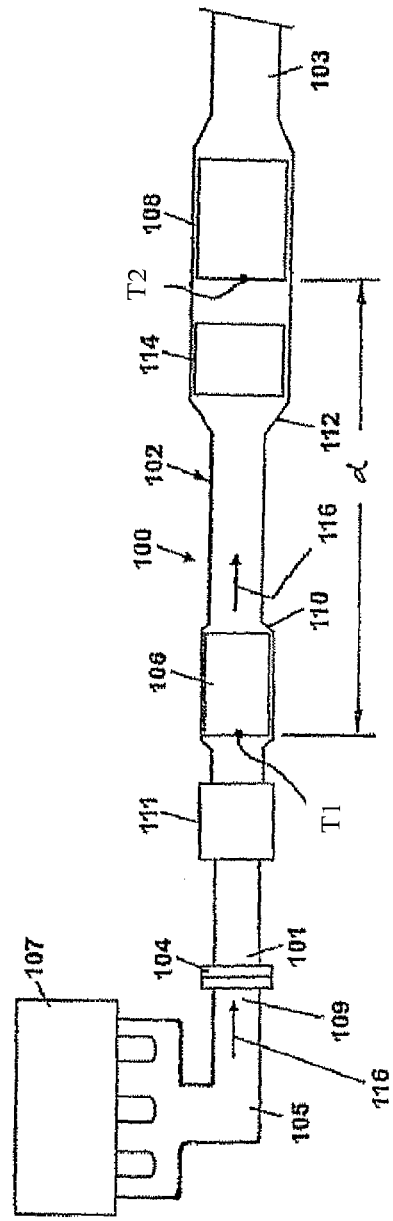
Fig. 2A
Fig. 2B

LOW BACK PRESSURE POROUS HONEYCOMB AND METHOD

CROSS-REFERENCE TO RELATED APPLICATIONS

This application is the National Stage of International Application No. PCT/US2009/003299 filed on May 29, 2009, which claims the benefit of provisional patent application No. 61/057,295, filed May 30, 2008.

BACKGROUND

The present invention relates generally to wall-flow filters used to filter exhaust gases, and exhaust systems, as well as methods for making and incorporating and such filters.

Diesel exhaust systems may include, for example, a diesel particulate filters (DPFs) for removing particulates, such as soot from diesel exhaust. Where multiple DPFs are used to remove particulates, these DPFs are typically arranged in close proximity to each other and housed within a common enclosure, such as taught in US Pat. App. No. 2004/0161373. The most widely used DPFs are wall-flow filter. The conventional wall-flow filter consists of a ceramic honeycomb substrate having longitudinal, parallel cell channels formed by a plurality of intersecting porous walls. The ends of the cell channels are typically plugged with a ceramic plugging cement to form a checkered pattern of plugs at the end faces of the honeycomb substrate. The cell channels of the filter typically have some ends plugged at an inlet end face of the honeycomb substrate, referred to herein as "inlet channels." Likewise, typically, the cell channels also have the remaining ends plugged to form a checkered pattern of plugs at an outlet end face of the honeycomb substrate, herein referred to as "outlet channels." In use, exhaust gas containing entrained soot particles enters into the inlet channels, flows through the porous walls (i.e., the wall-flow) and into the outlet channels, and exits through the outlet channels, with the porous walls retaining a portion of the particles contained in the exhaust. Conventional wall-flow filters may be cleaned out to prevent the filter from becoming blocked and to maintain a suitable pressure drop across the filter below a prescribed limit. Increase in pressure drop across the filter generally results in an increase in backpressure against the engine which, if not controlled, may lead to power loss. One known method for cleaning out the filter is to remove the soot trapped in the filter by thermal regeneration (hereinafter "regeneration"). The regeneration may be either "passive" or "active" or a combination thereof. In "passive" regeneration, the inlet temperature of the exhaust entering the filter is sufficiently high to itself initiate combustion of the soot trapped and additional energy input is required to raise the temperature of the exhaust (and the filter) to a level that would cause combustion of the soot trapped in the filter.

There are certain applications (e.g., off-road diesel engine applications and retrofit applications) where the specification on the wall-flow filter filtration efficiency is less rigorous, the wall-flow filters are required to have lower initial and total pressure drop, and smaller filter volume and low regeneration frequency are desirable. Conventional industry standard filters, as mentioned above, do not fulfill this need as a result of the filter's need to be regenerated on a regular/periodic basis and the resultant backpressure which builds up prior to the periodic regeneration.

Accordingly filters with reduced back pressures, moderately high clean and low filtration efficiency at high soot loading conditions, and which exhibit a soot bypass/self preservation feature at the same high soot loading levels/conditions thus requiring fewer regeneration events during operation, are desired for these off-road and retrofit applications.

SUMMARY

The present invention relates to ceramic honeycomb articles, and more particularly to ceramic honeycomb articles having properties suitable for use in exhaust after-treatment applications; particularly in those off-road and retrofit diesel exhaust filtration requiring reduced moderately high clean and low filtration efficiency, reduced backpressure and fewer regeneration events.

In a first aspect of the present invention, a porous ceramic honeycomb article is provided which includes a plurality of parallel cell channels separated by porous cell walls and exhibits a total porosity (% P) such that 40%<% P<70%. At least a portion of the ceramic honeycomb article's porosity constitutes coarse pores exhibiting a depth equivalent to the thickness of the cell wall and at least one dimensional width, in the plane of the cell wall, exhibiting a diameter (D) which is at least as large as the thickness of the cell wall.

Further, according to additional embodiments of the invention, the coarse pores exhibit an average pore diameter larger than 200 µm and are present in the honeycomb article cell walls such that the density of the coarse pores is approximately about $\geq 0.1$ pore/cm$^2$. Additionally, the ceramic honeycomb article's coarse pores exhibit an average pore diameter larger than 300 µm; and in some embodiments greater than 400 µm.

The inventive ceramic honeycomb articles of the invention are suitable for use in high temperature applications, and are particularly suitable for use as off-road and retrofit diesel exhaust filtration applications because these honeycomb articles exhibit low pressure drops, moderately high clean filtration efficiency and low filtration efficiency at high soot loading levels/conditions and require less frequent regeneration events, as a result of the bypass functionality of the coarse/large pore at high soot loading levels/conditions. To this end, in another aspect, there is provided a ceramic honeycomb article exhibiting the structure of a filter and having an inlet end and an outlet end, a multiplicity of cells extending from the inlet end to the outlet end, the cells having porous walls, wherein part of the total number of cells at the inlet end are plugged along a portion of their lengths, and the remaining part of the cells that are open at the inlet end are preferably plugged at the outlet end along a portion of their lengths, so that an engine exhaust stream passing through the cells of the honeycomb from the inlet end to the outlet end flows into the open cells, then through the cells walls, and out of the article through the open cells at the outlet end.

In another broad aspect of the present invention, a method for manufacturing a porous ceramic honeycomb article, as described above, is provided. The method comprises the steps of providing a plasticized ceramic precursor batch composition containing inorganic batch components; pore forming material capable of forming coarse/large pores; a liquid vehicle; and a binder. A honeycomb green body is then formed from the plasticized ceramic precursor batch composition and subsequently fired under conditions effective to convert the green body into a ceramic honeycomb article. In one aspect, the resulting fired ceramic honeycomb article has a total porosity greater than 40% and less than 70% and includes as a constituent of that porosity coarse/large pores exhibiting a depth equivalent to the thickness of the cell wall and at least one dimensional width, in the plane of the cell wall, which exhibits a diameter (D) that is at least as large as the thickness of the cell wall.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

FIGS. 2A and 2B are schematic diagrams of diesel exhaust systems according to embodiments of the invention;

DETAILED DESCRIPTION

Figure 1:
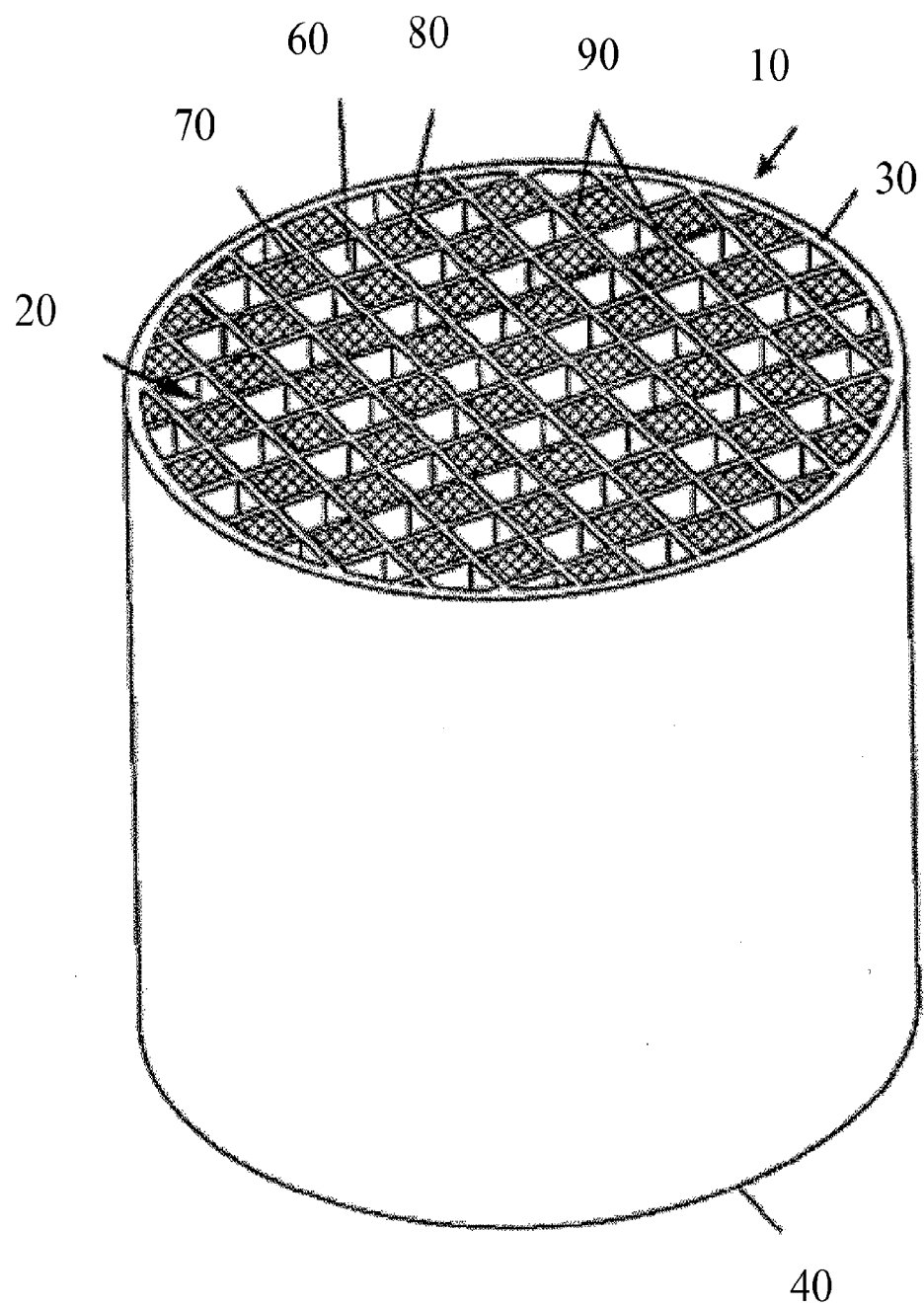
FIG. 1 is a perspective view of a ceramic honeycomb article according to the present invention.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

The present invention can be understood more readily by reference to the following detailed description, examples, and claims, and their previous and following description. However, before the present articles and/or methods are disclosed and described, it is to be understood that this invention is not limited to the specific articles and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "alumina forming source" includes aspects having two or more such alumina forming sources, unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of an organic component, unless specifically stated to the contrary, is based on the total weight of the total inorganics in which the component is included. Organics are specified herein as superadditions based upon 100% of the inorganics used.

As briefly introduced above, the present filter design seeks to provide an ceramic honeycomb article useful for filtration applications, such as diesel exhaust filters or DPFs, and particularly DPFs for use in off-road and retrofit ceramic filter applications which require moderately high filtration efficiency coupled with low pressure drop across the filter and a reduced need for regeneration. To this end, a pore microstructure is provided in a fired ceramic body that is characterized by a relatively high level of porosity and by the presence of at least some coarse/large pores. It has been found that such a microstructure provides the filter with a filter self-preservation feature, a reduced need for regeneration by allowing bypass of soot after a certain amount has accumulated, thus limiting the resulting increase in undesired backpressure and protecting the filter from damage due to "hot-spots" which typically may occur in un-regenerated wall-flow filters.

In accordance therewith, the present disclosure provides a ceramic honeycomb article, which in one aspect is composed predominately of a crystalline phase cordierite composition; however the honeycomb can be comprised of other ceramics including, for example aluminum titanate and silicon carbide.

The ceramic honeycomb article of the present disclosure details a porous honeycomb structure a ceramic material having a total porosity ranging between about 40% to 70%, in which a portion of that total porosity is comprised of large or coarse pores. Specifically, these large/coarse pores should be sized such that each pore is large enough to connect two adjacent channels, i.e. the depth of the pore must be equal to the thickness of the ceramic wall. In addition, the coarse/large pore should exhibit at least one dimensional width, specifically in plane of web, that is at least equal to or wider than the thickness of the partition wall; i.e., each coarse pore, present in the honeycomb structure, must exhibit at least one dimension in the plane of the web where the length of a line connecting any two points on the pore circumference located in the plane of the web, is at least as large as the thickness of the cell wall of the corresponding wall flow filter (See FIGS. 4 and 4a for additional detail). Generally, the pores which comprise the coarse pores exhibit a cylindrical shape.

Furthermore, these coarse/large pores should be present in a controlled distribution, such that the density of coarse pores in the fired partition wall surface is at least 0.1 coarse pore/$cm^2$ of the wall surface. In a further embodiment, that controlled distribution or density is at least 1.0 coarse pore/$cm^2$ of the wall surface and yet another embodiment at least 10 coarse pores/$cm^2$ of the wall surface. To determine this requisite density, a representative surface area of at least 25 $cm^2$, (at least 40 $cm^2$ in a separate embodiment) should be analyzed at a high enough magnification such that the coarse pores can be easily seen and counted; see FIGS. 3a and 3b for an approximately 40 $cm^2$ representative surface area. Given this density, it follows that the ceramic honeycomb article coarse/large pores comprise up to about 10% of the total porosity. In a first embodiment substantially all the channel cell walls surfaces exhibit this controlled coarse porosity distribution. In a second embodiment only a sufficient number of cell wall surfaces, some number less than 100%, are contemplated to exhibit this coarse porosity, however those cell walls containing the coarse pores must exhibit a sufficiently high coarse pore density such that the overall average porosity of the entire honeycomb substrate channel wall surfaces equals or exceeds the 0.1 (or 1.0 or 10) coarse pore/$cm^2$ level.

In another embodiment of the ceramic honeycomb, these coarse/large pores exhibit an average coarse pore diameter larger than 200 µm; in a further embodiment the spherical large/coarse pores exhibit an average pore diameter larger than 300 µm; in a still further embodiment the spherical coarse/large pores exhibit an average spherical pore diameter larger than 400 µm. It should be noted that one skilled in the art would recognize that the mercury porosimetry test would not be a suitable pore measurement technique for measuring pores of this average size. As such, this average coarse porosity diameter is measured by simply measuring a certain number of diameter or dimensional widths (as defined above) of a coarse pore, as observed in an sufficient magnification SEM photograph, and simply taking an average of those measurements; 5 measurements should be sufficient to obtain reasonably accurate average coarse pore diameter.

In addition to the presence of the aforementioned coarse/large pores, the ceramic honeycomb article total porosity includes a second group of small pores exhibiting a pore diameter ranging between about 8 to 35 µm.

For a number of retrofit Diesel, Particulate Filter (DPF) applications, where sophisticated controls for regeneration are not available, the system requirements for these filters include low pressure drop, high clean filter mass based filtration efficiency (in one embodiment >40% and in a further embodiment >50%) and low filtration efficiency (in one embodiment <40%, and in further embodiment <30%, and still further embodiment <10%) at high soot loads; high soot loads being defined as soot loads exceeding 2.5 grams/liter and in further embodiments exceeding 5 grams/liter. Not only does the pressure drop of the filter increase with soot build-up, but temperatures within the filter during regeneration can reach levels high enough to crack or melt the filter materials at high soot loads. Obviously, it is desirable that these conditions must be avoided. Given that sophisticated controls, accurate soot load estimation schemes and advanced regeneration strategies are not available in those systems requiring retrofit applications, the low filtration efficiency at high soot loading levels allows the particulate matter to bypass the filter at high soot loads, thereby avoiding detrimental and catastrophic effect of soot over-loading on the filter and the aftertreatment system. Filters with such properties also are attractive for other applications (e.g., off-road diesel engine, gasoline engine) where sophisticated controls are not available, having low pressure drop is critical or have only limited space for the DPF.

Referring now to FIG. 1, the honeycomb article 10 preferably has an inlet 30 and outlet end 40, and a multiplicity of cells 60, 80 extending from the inlet end to the outlet end, the cells formed from intersecting porous walls 50. The inventive articles 10 may have a cellular density from about 70 cells/$in^2$ (10.9 cells/$cm^2$) to about 400 cells/$in^2$ (62 cells/$cm^2$) and exhibit a wall thickness between about 4 and 16 mils. When the article is a filter, preferably a portion of the cells 70 at the inlet end 30 are plugged with a paste having same or similar composition to that of the body 20, as described in U.S. Pat. No. 4,329,162. The plugging is preferably performed only at the ends of the cells and form plugs 80 typically having a depth of about 5 to 20 mm, although this can vary. A portion of the cells on the outlet end 40 but not corresponding to those on the inlet end 30 may also be plugged in a similar pattern. Therefore, each cell is preferably plugged only at one end. The preferred arrangement is to have every other cell on a given face plugged as in a checkered pattern as shown. Optionally, some channels/cells could remain unplugged to modify the filtration efficiency and pressure drop profiles This plugging configuration allows for more intimate contact between the exhaust stream and the porous walls of the filter. The exhaust stream flows into the filter through the open cells at the inlet end 30, then through the porous cell walls 50, and out of the body 20 through the open cells at the outlet end 40. Filters 10 of the type herein described are known as "wall flow" filters since the flow paths resulting from alternate channel plugging require the exhaust being treated to flow through the porous ceramic cell walls prior to exiting the filter.

FIG. 2A depicts an exhaust system 100, such as a diesel exhaust system, for venting exhaust from an exhaust manifold 105 of a diesel engine 107. The exhaust system 100, as shown, includes an exhaust line 102 with inlet end 101 and outlet end 103. The inlet end 101 is coupled to the diesel engine 107 through an exhaust manifold 105. The inlet end 101 may include a connection device 104, which may take on any suitable form. For example, the connection device 104 may be a flange that can be coupled to a similar flange on a connection portion 109 of the exhaust manifold 105. Although the exhaust line 102 is shown as being generally straight, in practice it may take on other profiles and may include straight and curved sections and/or sections of differing diameter.

The exhaust system 100 includes a first particulate filter 106 disposed adjacent to the inlet end 101 of the exhaust line 102 so as to be in a "close-coupled" position with respect to the engine 107 and, of course, also the exhaust manifold 105. In this "close-coupled" position, the first particulate filter 106 may take advantage of the higher incident exhaust temperatures to effect a substantially greater extent of "passive" regeneration of the captured soot, as compared to the downstream second filter. The term "close-coupled" as used herein, means the filter is in a location in the exhaust stream in close proximity to the engine 107, and, in particular, in close proximity to the combustion chambers of the engine, as measured along the exhaust stream. For example, "close-coupled" would be considered in close proximity of the engine 107, measured along the exhaust line, such that the temperature for at least some portion of the operating cycle exceeds 250° C. Preferably, for at least 50% of the operation, the inlet temperature ($T_1$) of the first filter exceeds 200° C. In one example shown in FIG. 1A, a turbocharger 111 is positioned in the exhaust line 102 and the first particulate filter 106 is positioned upstream of the turbocharger 111 such that the hot gases directly impinge upon the first filter 106. In a more preferred embodiment, the first filter 106 is located directly downstream of the turbocharger 111 (See FIG. 2B). In the close-coupled position, the first filter 106 may experience temperature conditions of 250° C. or greater for a substantial amount, greater than 10%, or even greater than 20%, of the operating cycle. These conditions promote a substantial amount of "passive" regeneration. To avoid unwanted damage to the filter, the inlet temperature $T_1$ should preferably not exceed about 400° C.

The exhaust system 100 of the invention further includes a second particulate filter 108 positioned in the exhaust line 102, and spaced a distance (d) from the first particulate filter 106. In the examples shown in FIG. 2A, 2B, the second particulate filter 106 may be positioned downstream of a turbocharger 111. Additional particulate filters may be positioned in the exhaust line 102, downstream of the second particulate filter 106 to meet desired filtration and backpressure requirements. The second particulate filter 106 may be preceded by an upstream diesel oxidation catalyst (DOC) 114, which may incorporate any known active catalytic species for purifying exhaust, such as catalytic species for oxidizing carbon monoxide, hydrocarbons, and soluble organic fraction of particulates, as is known in the art. If included, the DOC 114 may be located between the first 106 and second 108 filters, or more preferably between the first filter 106 and the turbocharger 111. The exhaust system 100 may further include devices such as diffusion and expansion cones 110, 112 at the inlet and outlet ends of the particulate filters 106, 108 to aid in achieving desired exhaust flow distribution in the particulate filters, and/or size and weight reductions in the exhaust line 102.

During normal operation of the engine, such as a diesel engine, exhaust from the engine 107 and exhaust manifold 105 passes sequentially through the first particulate filter 106, turbocharger 111 (if present), oxidation catalyst 114 (if present), and second particulate filter 108, as indicated by arrow 116 in FIG. 2A. Particulates in the exhaust are trapped inside the first and second particulate filters 106, 108 as the exhaust passes through them. In particular, part of the soot is trapped in the first filter, while some of the remaining soot is trapped in the second filter. The engine operating conditions and location of the first filter 106 relative to the engine 107 may be set such that the inlet temperature $T_1$ of the exhaust at the first filter 106 is sufficient to itself initiate combustion of soot trapped in the first filter 106, i.e., promote "passive" regeneration.

According to embodiments of the invention, the first particulate filter 106 has a relatively low pressure drop in comparison to the second particulate filter 108. In one example, the first particulate filter 106 is small enough to fit into the available space near the exhaust manifold 105, between the exhaust manifold 105 and the turbocharger 111, or just downstream of the turbocharger. According to additional aspects of the invention, the physical space (volume) needed to house the first particulate filter 106 may be relatively smaller than the space (volume) to house the second filter 108, because the second particulate filter 108 provides the additional volume needed to meet filtration requirements. In a preferred implementation, the second particulate filter 108 may be a conventional wall-flow filter, for example. However, a conventional wall-flow filter would typically not be suitable for use as the first particulate filter 106 because of the size and pressure drop requirements for a filter in a "close-coupled" position. In particular, the it is desirable that the first filter exhibit low pressure drop. Because of the low pressure drop requirement, the first particulate filter 106 may have a lower filtration efficiency than the second particulate filter 108.

Reiterating disclosed herein is novel filter wall microstructure, particularly one that will result in filter performance with low initial and total pressure drop, smaller volume and lower regeneration frequency. As described in more detail above the filter comprises a total porosity, a portion of which is comprised of large/coarse pores which are sized such that each pore exhibits a depth equal to the thickness of the ceramic wall and a least one dimensional width (D), specifically in plane of web, that is at least equal to or wider than the thickness of the partition wall.

The invention also provides a method for fabricating the inventive ceramic honeycomb articles described above. To this end, it has now been discovered that a ceramic article having the aforementioned microstructure can be achieved from a ceramic precursor batch composition which comprises a coarse pore former capable of forming large/coarse pores as described above. Accordingly, the method of the present invention generally comprises the steps of first providing a plasticized ceramic precursor batch composition comprising inorganic ceramic forming batch component(s), a coarse pore former, a liquid vehicle, and a binder; forming a green body having a desired shape from the plasticized ceramic precursor batch composition; and firing the formed green body under conditions effective to convert the green body into a ceramic article.

The plasticized ceramic precursor batch composition can be comprised of any ceramic material useful for forming a porous honeycomb structure. The ceramic material may be selected from the group consisting of cordierite, aluminum titanate, silicon carbide, mullite, silicon nitride and other porous refractory materials.

One particularly suitable batch is that used to make cordierite and is provided here simply as a detailed example. That said, the inorganic batch components can be any combination of inorganic components which can, upon firing, provide a primary sintered phase composition comprised of cordierite containing ceramic.

For example, and without limitation, in one aspect, the inorganic batch components can be selected to provide a ceramic article which comprises at least about 93% by weight cordierite, the cordierite consisting essentially of, as characterized in an oxide weight percent basis, from about 49 to about 53 percent by weight $SiO_2$, from about 33 to about 38 percent by weight $Al_2O_3$, and from about 12 to about 16 percent by weight MgO.

To this end, an exemplary inorganic cordierite precursor powder batch composition preferably comprises about 33 to about 41 weight percent aluminum oxide source, about 46 to about 53 weight percent of a silica source, and about 11 to about 17 weight percent of a magnesium oxide source. Exemplary non-limiting inorganic batch component mixtures suitable for forming cordierite are those disclosed in U.S. Pat. No. 3,885,977.

The inorganic ceramic batch components can be synthetically produced materials such as oxides, hydroxides, and the like. Alternatively, they can be naturally occurring minerals such as clays, talcs, or any combination thereof. Thus, it should be understood that the present invention is not limited to any particular types of powders or raw materials, as such can be selected depending on the properties desired in the final ceramic body.

In one aspect, an exemplary and non-limiting magnesium oxide source can comprise talc. In a further aspect, suitable talcs can comprise talc having a mean particle size of at least about 5 µm, at least about 8 µm, at least about 12 µm, or even at least about 15 µm. Particle size is measured by a particle size distribution (PSD) technique, preferably by a Sedigraph by Micrometrics. Talc have particle sizes of between 15 and 25 µm are preferred. In still a further aspect, the talc can be a platy talc. As used herein, a platy talc refers to talc that exhibits a platelet particle morphology, i.e., particles having two long dimensions and one short dimension, or, for example, a length and width of the platelet that is much larger than its thickness. In one aspect, the talc possesses a morphology index greater than about 0.50, 0.60, 0.70, or 0.80. To this end, the morphology index, as disclosed in U.S. Pat. No. 5,141,686, is a measure of the degree of platiness of the talc. One typical procedure for measuring the morphology index is to place the sample in a holder so that the orientation of the platy talc is maximized within the plane of the sample holder. The x-ray diffraction (XRD) pattern can then be determined for the oriented talc. The morphology index semi-quantitatively relates the platy character of the talc to its XRD peak intensities using the following equation: where $I_x$ is the intensity of the peak and $I_y$ is that of the reflection.

Exemplary alumina forming sources can include aluminum oxides or a compound containing aluminum which when heated to sufficiently high temperature yields essentially 100% aluminum oxide. Non-limiting examples of alumina forming sources include corundum or alpha-alumina, gamma-alumina, transitional aluminas, aluminum hydroxide such as gibbsite and bayerite, boehmite, diaspore, aluminum isopropoxide and the like. Commercially available alumina sources can include relatively coarse aluminas, having a particle size of between about 4-6 micrometers, and a surface area of about 0.5-1 $m^2/g$, and relatively fine aluminas having a particle size of between about 0.5-2 micrometers, and a surface area of about 8-11 $m^2/g$.

If desired, the alumina source can also comprise a dispersible alumina forming source. As used herein, a dispersible alumina forming source is an alumina forming source that is at least substantially dispersible in a solvent or liquid medium and that can be used to provide a colloidal suspension in a solvent or liquid medium. In one aspect, a dispersible alumina source can be a relatively high surface area alumina source having a specific surface area of at least 20 $m^2/g$. Alternatively, a dispersible alumina source can have a specific surface area of at least 50 $m^2/µg$. In an exemplary aspect, a suitable dispersible alumina source for use in the methods of the instant invention comprises alpha aluminum oxide hydroxide ($AlOOH.x.H_2O$) commonly referred to as boehmite, pseudo-boehmite, and as aluminum monohydrate. In another exemplary aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities.

Suitable silica forming sources can in one aspect comprise clay or mixtures, such as for example, raw kaolin, calcined kaolin, and/or mixtures thereof. Exemplary and non-limiting clays include non-delaminated kaolinite raw clay, having a particle size of about 7-9 micrometers, and a surface area of about 5-7 $m^2/g$, clays having a particle size of about 2-5 micrometers, and a surface area of about 10-14 $m^2/g$, delaminated kaolinite having a particle size of about 1-3 micrometers, and a surface area of about 13-17 $m^2/g$ calcined clay, having a particle size of about 1-3 micrometers, and a surface area of about 6-8 $m^2/g$.

In a further aspect, it should also be understood that the silica forming source can further comprise, if desired, a silica raw material including fused $SiO_2$; colloidal silica; crystalline silica, such as quartz or cristobalite, or a low-alumina substantially alkali-free zeolite. Further, in still another aspect, the silica forming source can comprise a compound that forms free silica when heated, such as for example, silicic acid or a silicon organo-metallic compound.

As set forth above, the plasticized ceramic precursor batch composition further comprises a pore former capable of forming coarse/large pores as previously described above. As will be appreciated by one of ordinary skill in the art, a pore former is a fugitive particulate material which evaporates or undergoes vaporization by combustion during drying or heating of the green body to obtain a desired, usually larger porosity and/or coarser median pore diameter than would otherwise be obtained. It has been discovered that the use of certain large particle size pore formers, enables the manufacture of ceramic articles possessing the coarse/large pores described above.

The aforementioned pore former is selected from the following options: (1) an additive material capable of creating a localized region of eutectic melting; (2) a large particle size organic material capable of burning out at high temperature, and; (3) a large particle size ceramic batch raw material. In each of these pore forming options/embodiments, the pore former should be chosen such that that they are capable of forming, and result in the formation of the coarse/large pores which exhibit the requisite large size; a depth equal to the thickness of the ceramic wall and a at least one dimensional width, specifically in plane of web, exhibiting a diameter which is at least as large as the thickness of the cell wall of the so-formed wall flow filter. That said, for the additive material the size of the localized region must be large enough to ensure this coarse/large pore size and for the organic and batch material options the particle sizes of those materials must be sufficiently large to achieve the same.

In the "additive material" embodiment, incorporating these additives into the ceramic batch composition creates a localized region of eutectic melting during the firing process. In other words, the coarse additive particles added to the batch result in the formation of a liquid phase when in contact with the base composition raw materials during high temperature firing of the honeycomb; this liquid phase is eventually adsorbed into the ceramic structure and typically forms a separate non-ceramic (e.g. non-cordierite) phase within the ceramic matrix; e.g., a glass phase. Suitable additives capable of creating this eutectic melting phenomenon include, but should not be restricted to: rare earth oxides, alkali oxides, phosphates, borates, transition metal oxides or metals, and talc, steatite, enstatite, forsterite or materials containing these.

Regarding the "large particle size organic material" embodiment, incorporating these in the ceramic batch composition results in these materials burning out at those high temperatures reached during firing thereby leaving a large void; i.e., a large pore. The particle size of these organics must be carefully controlled so as to be in a narrow range such that the particles may be coarse enough to create a large/coarse pore, but fine enough so that they do not result in plugging of the extrusion die. The median particle diameter for the additive phase(s) should be about one tenth to three tenths of the slot width in the die with the top end of the distribution being less than about two thirds of the slot width.

Regarding the "large size/coarse ceramic raw material" embodiment, incorporating these into the ceramic batch composition results in these raw materials forming a liquid which ultimately is adsorbed into, and forms a part of the ceramic structure. Again the formation of the liquid which is pulled/adsorbed into the ceramic structure leaves behind a large/ coarse void; i.e., a pore. In the cordierite example above, the talc raw material can serve as the large size raw material capable of producing the requisite/desired large/coarse pores.

The inorganic batch components and the coarse/large pore former can be intimately blended with a liquid vehicle and forming aids which impart plastic formability and green strength to the raw materials when they are shaped into a body. Forming may be done by, for example, molding or extrusion. When forming is done by extrusion, most typically a cellulose ether binder such as methylcellulose, hydroxypropyl methylcellulose, methylcellulose derivatives, and/or any combinations thereof, serve as a binder, and sodium stearate or oleic acid serves as a lubricant. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 2% by weight sodium stearate or oleic acid, and preferably about 1.0% by weight. The raw materials and the coarse/large pore former are typically mixed together in dry form and then mixed with water as the vehicle. The amount of water can vary from one batch of materials to another and therefore is determined by pre-testing the particular batch for extrudability.

The liquid vehicle component can vary depending on the type of material used in order to in part optimum handling properties and compatibility with the other components in the ceramic batch mixture. Typically, the liquid vehicle content is usually in the range of from 20% to 50% by weight of the plasticized composition. In one aspect, the liquid vehicle component can comprise water.

The resulting stiff, uniform, and extrudable plasticized ceramic precursor batch composition can then be shaped into a green body by any known conventional ceramic forming process, such as, e.g., extrusion, injection molding, slip casting, centrifugal casting, pressure casting, dry pressing, and the like. In an exemplary aspect, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The instant method and the resulting ceramic articles are in one aspect especially suited for use, as mentioned above as diesel particulate filters. Specifically, the inventive ceramic articles are especially suited as off-road or retrofit multicellular honeycomb articles having a moderately high clean and low at high soot loading conditions, a low pressure drop between the entrance and exit faces of the filter, and reduced occurrence of regeneration events. To this end, in one aspect the plasticized ceramic precursor batch composition can be formed or otherwise shaped into a honeycomb configuration. Although a honeycomb ceramic filter of the present invention normally has a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like an "doglegged shape," or the like. In addition, the shape of through holes is not particularly limited. For example, the sectional shape may be a polygon, such as a square, a hexagon, an octagon, a circle, an ellipse, a triangle, or other shapes or combinations. It should however be understood that the particular desired size and shape of the ceramic article can depend on the application, e.g., in automotive applications by engine size and space available for mounting, etc.

The formed green body having a desired size and shape as described above can then be dried to remove excess moisture therefrom. The drying step can be performed by hot air, microwave, steam, or dielectric drying, or combinations and may be followed by ambient air drying. Once dried, the green body can thereafter be fired under conditions effective to convert the green body into a ceramic article comprising a primary crystalline phase ceramic composition as described below.

The firing conditions effective to convert the green body into a ceramic honeycomb article can vary depending on the process conditions such as, for example, the specific composition, size of the green body, and nature of the equipment used. To that end, in one aspect, the optimal firing conditions specified herein may need to be adapted for very large cordierite structures, i.e., slowed down, for example. However, in one aspect, for plasticized mixtures that are primarily for forming cordierite, the firing conditions comprise heating the green body to a maximum soak temperature of between about 1350° C. to about 1450° C. In still another aspect, the green body can be fired at a soak temperature in the range of from about 1400° C. to about 1450° C. In still yet another aspect, the green body may be fired at a soak temperature in the range of from about 1415° C. to about 1435° C., including a preferred soak temperature of, for example, of between about 1420° C. and about 1430° C.

The firing times can also range from approximately 40 to 250 hours, during which a maximum soak temperature can be reached and held for a soak time in the range of from about 5 hours to about 50 hours, more preferably between about 10 hours to about 40 hours. In still another aspect, the soak time may be in the range of from about 15 hours to about 30 hours. A preferred firing schedule includes firing at a soak temperature of between about 1415° C. and 1435° C. for between about 10 hours to about 35 hours.

EXAMPLES

To further illustrate the principles of the present invention, the following examples are put forth so as to provide those of ordinary skill in the art with a complete disclosure and description of how the ceramic articles and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is ° C. or is at ambient temperature, and pressure is at or near atmospheric.

A series of inventive and comparative cordierite honeycomb articles were prepared using various combinations of starting raw materials, including, powdered talc, kaolin, alumina-forming sources, silica-forming sources, binder, pore former, liquid vehicle, and lubricant and/or surfactant. The specific inventive (Inv.) and comparative (Comp.) powder batch compositions used to prepare the inventive and comparative cordierite honeycomb articles are set forth in Table 1 below. It should be noted that the coarse pore former utilized in composition A was coarse Ytrium oxide, while in composition B coarse Bentonite clay (including impurities such as alkali, alkaline earths and iron) functioned as the large size additive pore former; it follows that, composition C did not include a coarse/large pore forming material.

The compositions A-C were mixed with water and mulled to a consistency good for extrusion, and then were extruded on a ram extruder through a 275 cpsi/8 mil die to form 5.66 dia/6" in length honeycombs exhibiting a cpsi/wall thickness of 275/8. These formed honeycombs were thereafter dried in microwave, fired to 1415° C. and plugged utilizing a standard plug pattern.

TABLE 1

Batch Compositions (Wt. %)

| Composition | A -- Inv | B -- Inv. | C -- Comp |
|---|---|---|---|
| Alumina | 30.12 | 30.12 | 30.12 |
| Dispal | 5.00 | 5.00 | 5.00 |
| Talc | 42.38 | 42.38 | 42.38 |
| Silica Source (Quartz) | 23.50 | 23.50 | 23.50 |
| Bentonite | — | 5.00 | — |
| Yttrium Oxide (fine) | 1.00 | 1.00 | — |
| Yttrium Oxide (coarse) | 0.43 | — | 0.43 |
| Walnut Shell Flour | 30.00 | 30.00 | 30.00 |
| Graphite | | 30.00 | |
| Binder (Methocel) | 6.00 | 6.00 | 6.00 |
| Liga | 1.00 | 1.00 | 1.00 |

Figure 3A:
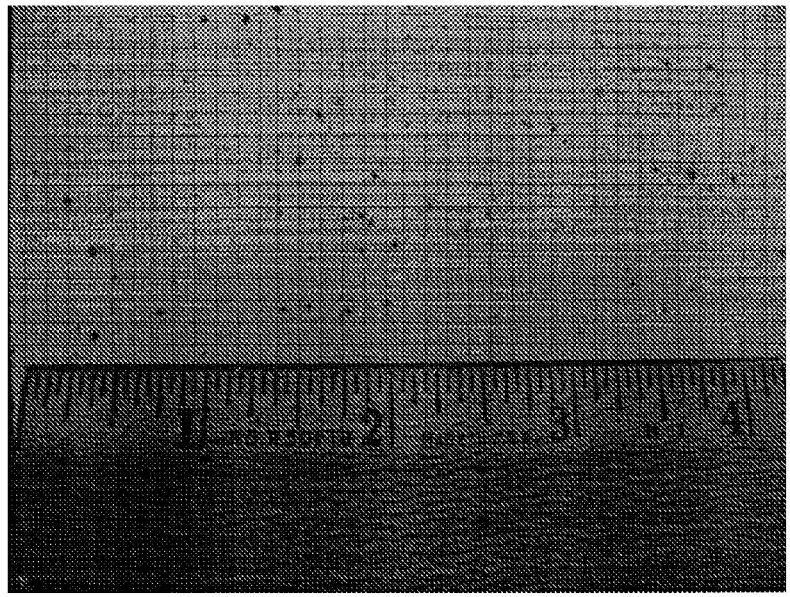
FIGS. 3A and 3B are photographs of exemplary embodiments of the honeycomb structures illustrating the presence and density of the coarse pores.
Figure 3B:
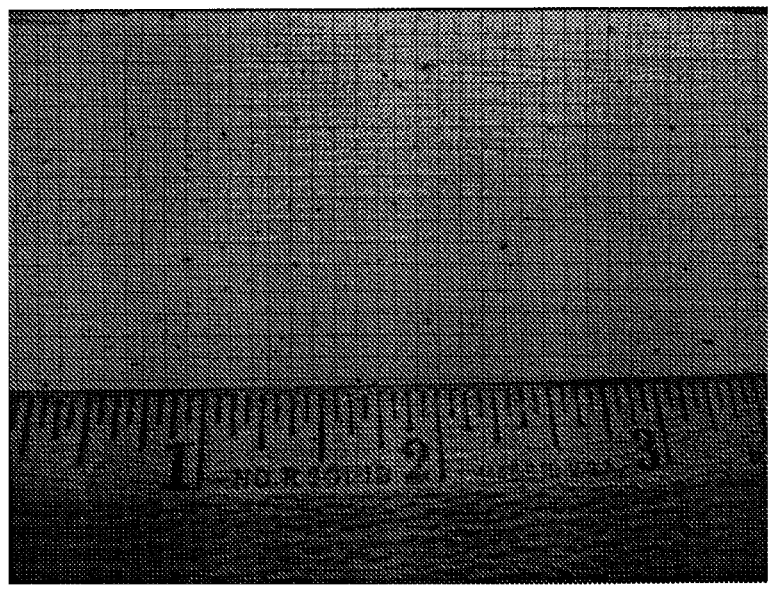

FIGS. 3A and 3B are photographs illustrate filter cross sections of the composition A and B honeycomb filters, respectively; a controlled density/pattern of coarse/large pores is evident in each of the inventive honeycomb filters. Specifically, an examination/analysis of the photograph of the composition A and B honeycomb, each sample measuring approximately 40 cm$^2$, reveals the "controlled distribution" and requisite density of large pores previously mentioned; particularly it can be seen that large pores are present in such a frequency and pattern that exceeds at least 0.1 and 1.0 and 10 coarse pores per square cm. It should be noted that given the lack of magnification in this representative view, any pore which can be detected in this view should be considered a coarse pore; i.e., the small/fine pores are of such size (~8 to 35 μm) that they can not be detected without magnification.

Figure 4A:
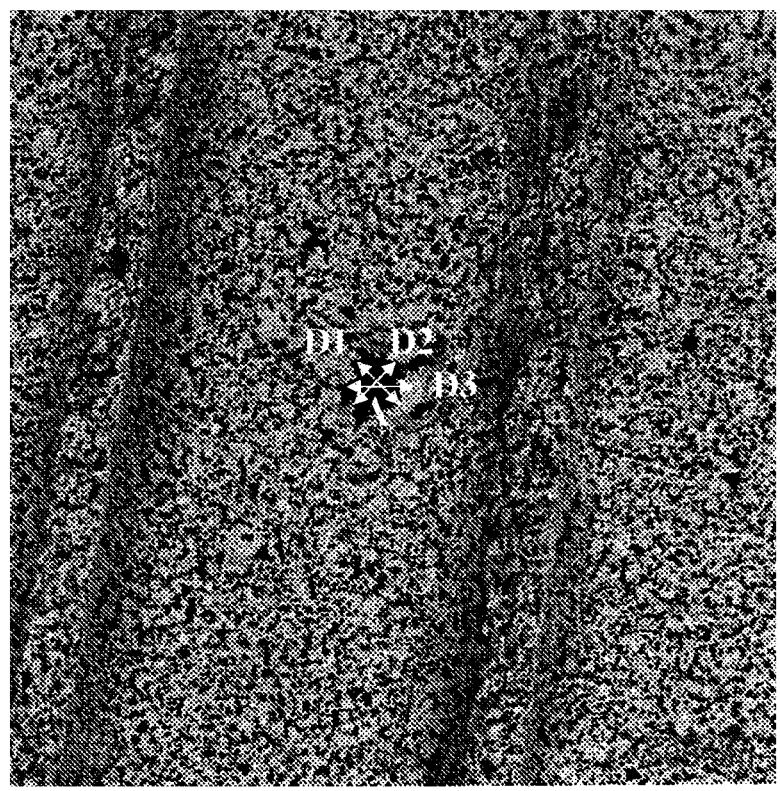
FIGS. 4A and 4B are SEM micrographs of exemplary embodiments of the honeycomb structures illustrating the size of the coarse pores.
Figure 4B:
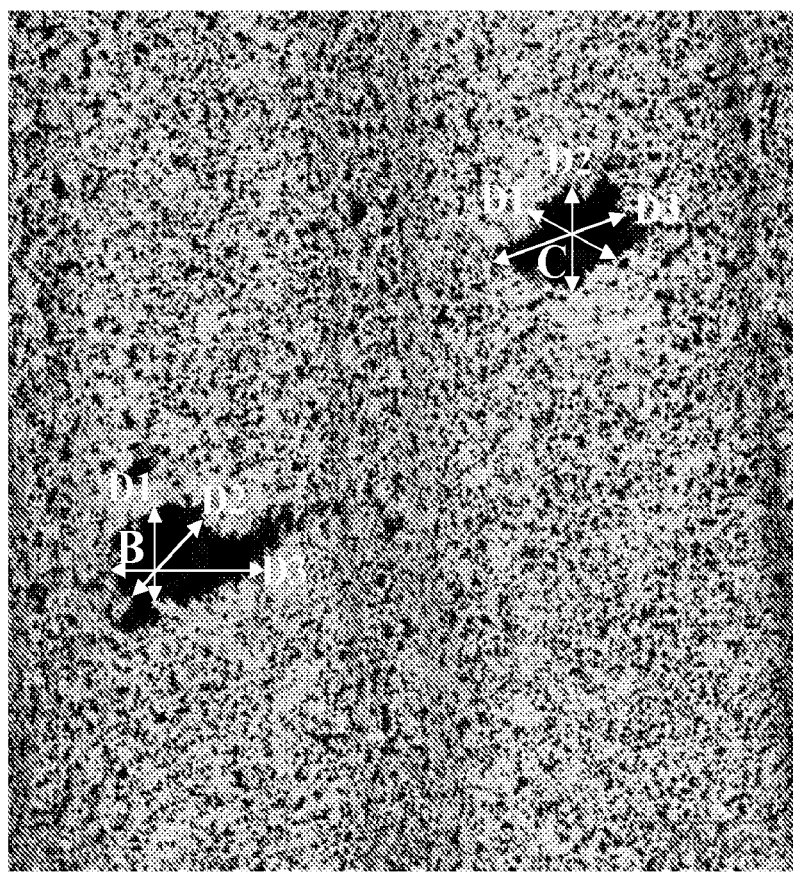

Referring now to FIGS. 4A and 4B, which are SEM micrographs (50× magnification), evident in each of the magnified views of the as-fired cell walls of the composition A and B filters, respectively is a coarse/large pore which exhibits the requisite large size; a depth equivalent to the thickness of the cell wall and at least one dimensional width, in the plane of the cell wall, exhibiting a diameter (D) which is at least as large as the thickness of the cell wall; note D1, D2 and D3 indicated on each of the pores exhibited on both FIGS. 4A and 4B, all of which exhibit a dimension larger than the thickness of the cell wall. It can be seen from a further examination of each of the Figures that the honeycomb possesses both coarse pores (pore designated A in FIG. 4a and pores designated B and C in FIG. 4b) as well as a second group of small/fine pores exhibiting a pore diameter ranging between about 8 to 35 μm. Additionally, it should be noted that this 500× magnification is a sufficient magnification for calculating the average pore size utilizing the 5 data point methodology earlier mentioned; e.g. the FIG. 4b coarse pore designated B exhibits an average pore size of 390 μm and the coarse pore designated C exhibits an average pore size of 400 μm, both utilizing this measurement methodology.

Figure 5:
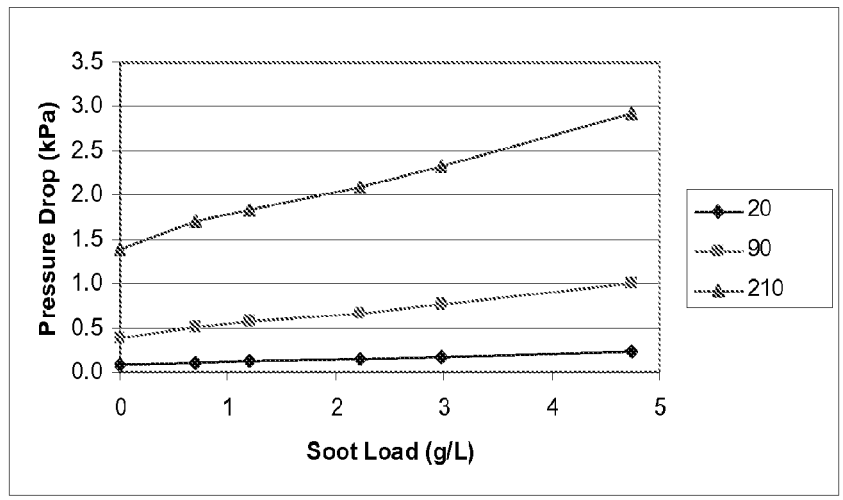
FIG. 5 is a graph illustrating pressure drop vs. soot load for an exemplary ceramic honeycomb article according to the present invention.
Figure 6:
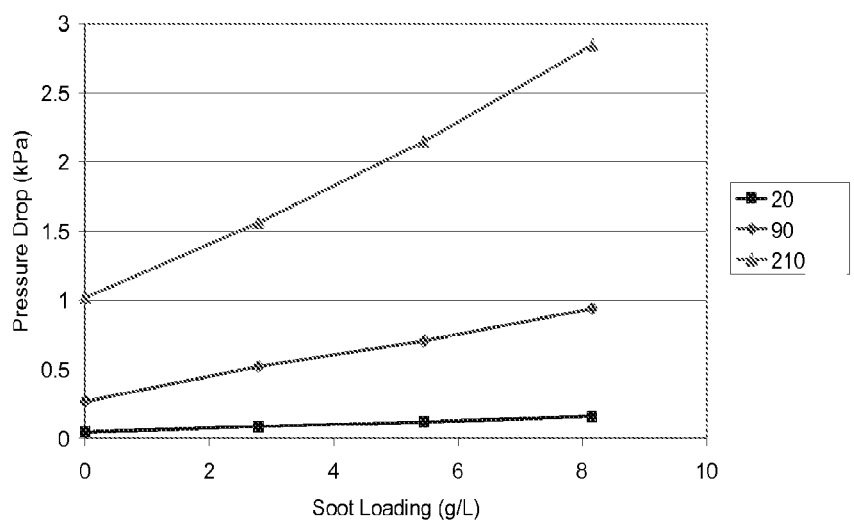
FIG. 6 is a graph illustrating pressure drop vs. soot load for an comparative ceramic honeycomb article.

Referring now to FIGS. 5 and 6, shown is the comparison of the pressure drop behavior of soot loaded novel and standard microstructure DPFs; specifically composition A (FIG. 5) and C (FIG. 6) honeycombs, at three different flow rates 20, 90 and 210 cubic ft./hr. (indicated as 20, 90 and 210). The novel microstructure filter, composition A, exhibiting the aforementioned 5.66" diameter, 6" length and cpsi/wall thickness of 275/8 size and standard plug pattern configuration and including as a constituent of its total porosity coarse/large pores, exhibited a pressure drop that is significantly lower than the corresponding pressure drop characteristics of the standard composition C filter (exhibiting only small pores of a size distribution ranging from 8 μm to 35 μm).

Figure 7:
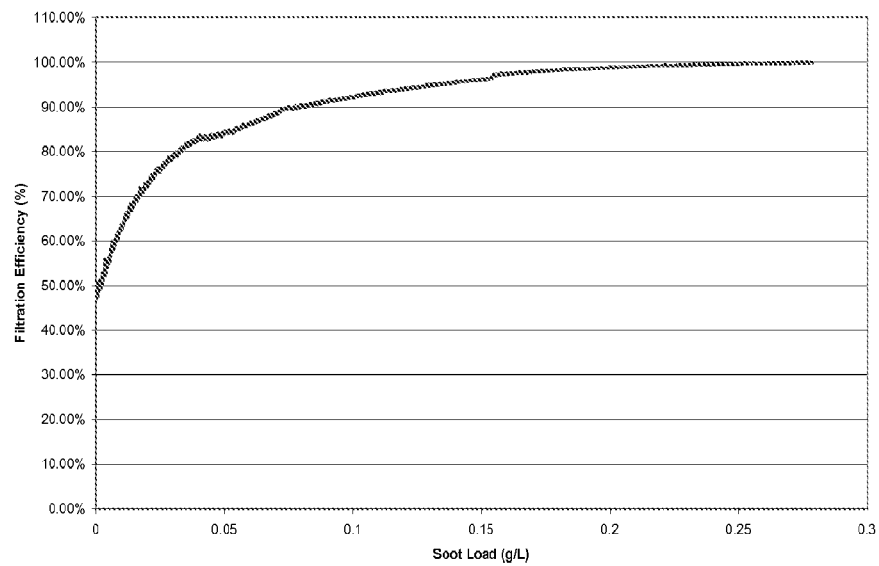
FIG. 7 is a graph illustrating filtration efficiency vs. soot load for an exemplary ceramic honeycomb article according to the present invention.
Figure 8:
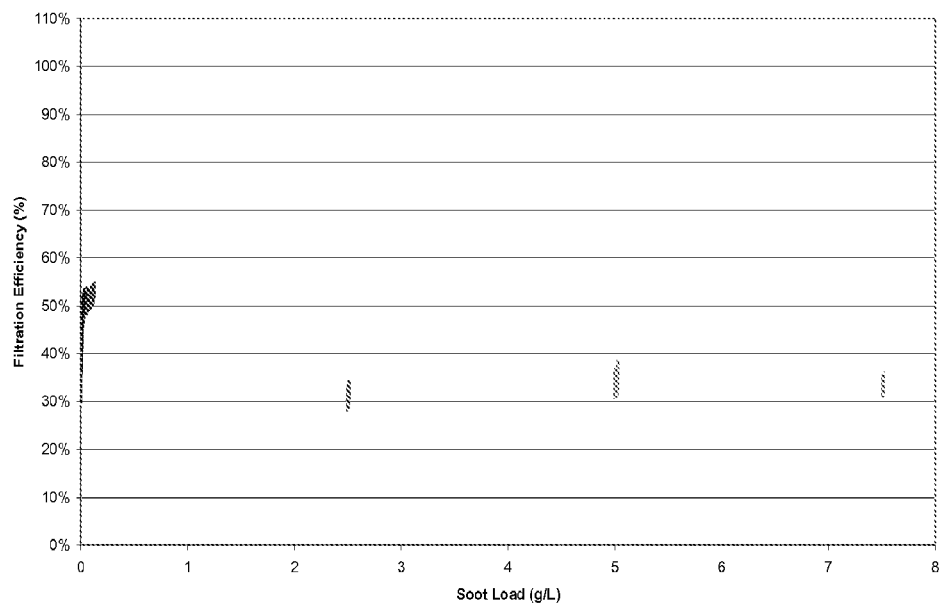
FIG. 8 is a graph illustrating filtration efficiency vs. soot load for comparative ceramic honeycomb article.

Referring now to FIGS. 7 and 8, illustrated therein are the filtration efficiency (FE) behavior of the standard and novel microstructure filters (compositions A and C) shown in FIGS. 5 and 6. Both the standard and novel microstructure filters, each exhibiting the aforementioned 5.66" diameter, 6" length and cpsi/wall thickness of 275/8 size and standard plug pattern configuration, were tested under the following conditions: mean size of the soot particle distribution of 113 nm, with the gas flow rate of 700 lpm at RT. While for the standard filter, composition C, the FE starts from a clean filter efficiency and then gradually increases to 100% (for a soot loading value of 0.3 g/l) as soot is trapped in the filter; at soot loadings exceeding 0.3 g/l the filtration efficiency remains at or near 100%, However, because of the presence of significant fraction of very large pores in the novel microstructure of the composition A filter, the soot particles leak through these large pores resulting in the FE to only increase to around 50% and then gradually decreasing to ~30% with increase in soot load levels. In particular, an examination of FIG. 8 reveals that the novel filter exhibits a filtration efficiency of less than 40% at soot loadings of 2.5 g/l, 5 g/l and as high as 7.5 g/l. Consequently, this filter may also act as a bypass at high load loadings, allowing most of the effluent stream to flow through the big pores. Since the soot loading rate of the novel microstructure filter is moderate, the regeneration frequency is greatly reduced. The low back-pressure of these filters allows for the use of smaller filters, which also contributes to the reduction of the size of the after-treatment system design.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A porous ceramic honeycomb article having a plurality of parallel cell channels separated by porous cell walls, comprising:
    a ceramic material having a total porosity (%P) such that 40<% P<70, with at least a portion of the porosity constituting coarse pores exhibiting a depth equivalent to a thickness of the cell walls and at least one dimensional width, in a plane of the cell walls, exhibiting a diameter (D) which is at least as large as the thickness of the cell walls.

2. The porous ceramic honeycomb article of claim 1, wherein the coarse pores exhibit an average pore diameter greater than 200 μm.

3. The ceramic honeycomb article of claim 1, wherein the coarse pores exhibit an average pore diameter greater than 300 μm.

4. The ceramic honeycomb article of claim 1, wherein the coarse pores exhibit an average pore diameter greater than 400 μm.

5. The ceramic honeycomb article of claim 1, wherein density of the coarse pores is controlled such that the density is greater than or equal to about 0.1 pore/cm².

6. The ceramic honeycomb article of claim 1, wherein density of the coarse pores is controlled such that the density is greater than or equal to about 1 pore/cm².

7. The ceramic honeycomb article of claim 1, wherein density of the coarse pores is controlled such that the density is greater than or equal to about 10 pore/cm².

8. The ceramic honeycomb article of claim 1, wherein the article further includes a second group of small pores exhibiting a pore diameter ranging between about 8 to 35 μm.

9. The ceramic honeycomb article of claim 1, wherein the article exhibits a filtration efficiency of less than or equal to 40% at conditions when a soot loading exceeds 2.5 g/l.

10. The ceramic honeycomb article of claim 1, wherein the article exhibits a filtration efficiency of less than or equal to 10% at conditions when a soot loading exceeds 2.5 g/l.

11. The ceramic honeycomb article of claim 1, wherein the article exhibits a filtration efficiency of less than or equal to 40% at conditions when a soot loading exceeds 5 g/l.

12. The ceramic honeycomb article of claim 1, wherein the article exhibits a filtration efficiency of less than or equal to 10% at conditions when a soot loading exceeds 5 g/l.

13. A method of manufacturing a ceramic honeycomb article comprising the steps of:
providing a forming a plasticized ceramic precursor batch composition, the batch including a pore forming material capable of forming coarse pores;
forming a honeycomb green body from the plasticized ceramic precursor batch composition; and
firing the honeycomb green body under conditions effective to convert the honeycomb green body into the ceramic honeycomb article and having a total porosity greater than 40% and less than 70% and with at least a portion of the porosity constituting coarse pores exhibiting a depth equivalent to a thickness of cell walls and at least one dimensional width, in a plane of the cell walls, exhibiting a diameter (D) that is at least as large as the thickness of the cell walls.

14. The method of claim 13, wherein the pore forming material is selected from the group consisting of an additive material capable of creating a localized region of eutectic melting, a large particle size organic material capable of burning out at high temperature, and a large particle size ceramic batch raw material, and wherein a size of the localized region, the particle size of the organic material, and the particle size of the ceramic batch raw material are such that they are capable of forming the coarse pores.

15. The method of claim 14, wherein the additive material is selected from the group consisting of rare earth oxides, alkali oxides, phosphates, borates, transition metal oxides or metals, and talc, steatite, enstatite, forsterite and/or mixture thereof 16. The method of claim 13, wherein the plasticized ceramic precursor batch composition is a cordierite precursor batch and comprises inorganic batch components selected from a group consisting of a magnesium oxide source, an alumina-forming source, a silica-forming source, a liquid vehicle, a binder, and the pore forming material capable of forming coarse pores.

17. The method of claim 16, wherein the pore forming material is a large particle size cordierite raw material with that raw material being talc.

18. An exhaust system for venting exhaust from an engine through an exhaust line coupled to the engine, comprising:
a first particulate filter disposed in the exhaust line and close-coupled with the engine, the first particulate filter operating in a first relative extent in a passive regeneration mode, the first particulate filter being a porous ceramic material having a total porosity (% P) such that 40%<% P<70%, with at least a portion of the porosity constituting coarse pores exhibiting a depth equivalent to a thickness of cell walls and a at least one dimensional width, in a plane of the cell walls, exhibiting a diameter (D) that is at least as large as the thickness of the cell walls; and
a second particulate filter positioned inline with, and spaced a distance from, the first particulate filter and operating to a second relative extent in a passive regeneration mode less substantially than the first relative extent.

19. The exhaust system of claim 18, wherein the first particulate filter is positioned downstream of a turbocharger disposed in the exhaust line.

20. The exhaust system of claim 18, further comprising a diesel oxidation catalyst positioned between the first particulate filter and the second particulate filter.

* * * * *